United States Patent
St. Jacques, Jr. et al.

(10) Patent No.: US 8,339,639 B2
(45) Date of Patent: Dec. 25, 2012

(54) METHOD AND SYSTEM FOR AUTOMATICALLY PROVIDING FOR MULTI-POINT DOCUMENT STORING, ACCESS, AND RETRIEVAL

(75) Inventors: Robert James St. Jacques, Jr., Fairport, NY (US); Hua Liu, Fairport, NY (US); Shanmuga-nathan Gnanasambandam, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 853 days.

(21) Appl. No.: 12/335,048

(22) Filed: Dec. 15, 2008

(65) Prior Publication Data

US 2010/0149572 A1    Jun. 17, 2010

(51) Int. Cl.
*G06F 3/12* (2006.01)
*G06F 15/167* (2006.01)
*G06F 15/16* (2006.01)

(52) U.S. Cl. ............... 358/1.15; 707/999.001; 709/217; 709/212; 709/214

(58) Field of Classification Search ........ 358/1.11–1.18; 707/622, 999.1, E17.032, E17.01; 709/201–204, 709/220; 715/847; 380/51, 278, 283
See application file for complete search history.

(56) References Cited

U.S. PATENT DOCUMENTS

| | | | | |
|---|---|---|---|---|
| 5,812,747 | A * | 9/1998 | Kayano et al. | 358/1.15 |
| 7,202,962 | B2 * | 4/2007 | Roosen et al. | 358/1.15 |
| 7,508,939 | B2 * | 3/2009 | Hashimoto | 380/51 |
| 7,777,906 | B2 * | 8/2010 | Namikata | 358/1.15 |
| 7,884,957 | B2 * | 2/2011 | Morikawa et al. | 358/1.15 |
| 2004/0027601 | A1 * | 2/2004 | Ito et al. | 358/1.15 |
| 2004/0117389 | A1 * | 6/2004 | Enami et al. | 707/100 |
| 2005/0286080 | A1 * | 12/2005 | Lee et al. | 358/1.15 |
| 2006/0028677 | A1 * | 2/2006 | Isshiki et al. | 358/1.15 |
| 2006/0028678 | A1 * | 2/2006 | Negishi et al. | 358/1.15 |
| 2008/0222154 | A1 | 9/2008 | Harrington et al. | |

OTHER PUBLICATIONS

Balfanz et al., "Talking to Strangers: Authentication in Ad-Hoc Wireless Networks", Palo Alto Research Center, Palo Alto, CA, Mar. 2002.
HP CoudPrint, "Share, Print and Store Documents with your Mobile Phone", www.cloudprint.hpl.hp.com/help.shtml, 2007.
Kindberg et al., "People, places, things: web presence for the real world", Internet Systems and Labs, Palo Alto, CA, www.cs.colorado.edu, Fall 2007.
Kindberg et al., "Towards a Real-World Wide Web", Internet and Mobile Systems Lab, Hewlett-Packard Co., Apr. 2000.

* cited by examiner

*Primary Examiner* — Charlotte M Baker
*Assistant Examiner* — Chad Dickerson
(74) *Attorney, Agent, or Firm* — Fay Sharpe LLP

(57) ABSTRACT

A method and a system for storing, accessing, and retrieving data, the printing system including a plurality of multifunction devices (MFDs) in operable communication with a network, the plurality of MFDs configured to be positioned in different geographical locations; and a memory device for automatically storing the data generated by the plurality of MFDs; wherein an authorized user is enabled to print a document via a print request from a first MFD of the plurality of MFDs and then retrieve the document at any of the other MFDs on the network without re-sending another print request from the first MFD.

21 Claims, 5 Drawing Sheets

METHOD AND SYSTEM FOR AUTOMATICALLY PROVIDING FOR MULTI-POINT DOCUMENT STORING, ACCESS, AND RETRIEVAL

BACKGROUND

1. Field of the Related Art

The present disclosure relates to printing systems, and more particularly, to a method and a system for storing, accessing, and retrieving documents within a multi-point document printing system.

2. Background of the Related Art

In general, a multifunction device (MFD) operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, because of their network transmission capabilities combined with their functionality, it would be useful for a user of one MFD to print to another MFD without the need of a centralized server.

In many instances, individuals attempt to print to a printing device, only to find that the printing task was lost or failed to print to such a printing device. On certain occasions, individuals may wish to (1) reprint a printing task on a different printing device than the one originally used or (2) retrieve a scanned document from one multifunction device (MFD) and reprint it on another MFD. In most cases, these tasks are accomplished if the individual resends the printing task from his or her workstation to the second printing device or retrieves the document from the first MFD and re-sends it from his workstation to the second MFD. However, this is quite cumbersome and time-consuming to many individuals.

Moreover, in existing printing solutions, an individual sometimes prints to a device and finds that the job/task was lost or did not print successfully. Other times, after walking to the printer, the individual may wish to share a previously printed document with others, print more copies and/or convert document formats without using a computer. While there are server-based techniques to achieve aforementioned storage-based scenarios, the effort to pre-establish stored content is not negligible to an average user. For example, users have to determine whether there is a server, create an account, interact with the system through a specific user interface (e.g. a Web User Interface (UI)), upload/store documents or browse and retrieve documents through this interface. Efforts for developers to make such systems widely available involve extra time and labor.

Thus, while some conventional systems allow document sharing, such document sharing mechanisms usually involve saving the printing tasks on a remotely mounted centralized server accessible by multiple devices.

Consequently, current systems employing servers lack the capability to effectively share documents with a plurality of users either located in the same facility and/or located in various remote geographical areas. The present disclosure is intended to overcome the drawbacks of other methods by providing for multi-point access printing systems. In particular, the present disclosure relates to a system and method for storing, accessing, and retrieving documents within a multi-point document printing system, without using a centralized server.

SUMMARY

The present disclosure provides a printing system for storing, accessing, and retrieving data, the printing system including a plurality of multifunction devices (MFDs) in operable communication with a network, the plurality of MFDs configured to be positioned in different geographical locations; and a memory device for automatically storing the data generated by the plurality of MFDs; wherein an authorized user is enabled to print a document via a print request from a first MFD of the plurality of MFDs and then retrieve the document at any of the other MFDs on the network without re-sending another print request from the first MFD.

The present disclosure also provides a method for storing, accessing, and retrieving data, the method including the steps of enabling a plurality of multifunction devices (MFDs) to be in operable communication with a network, the plurality of MFDs configured to be positioned in different geographical locations; and automatically storing the data generated by the plurality of MFDs on a memory device; wherein an authorized user is enabled to print a document via a print request from a first MFD of the plurality of MFDs and then retrieve the document at any of the other MFDs on the network without re-sending another print request from the first MFD.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
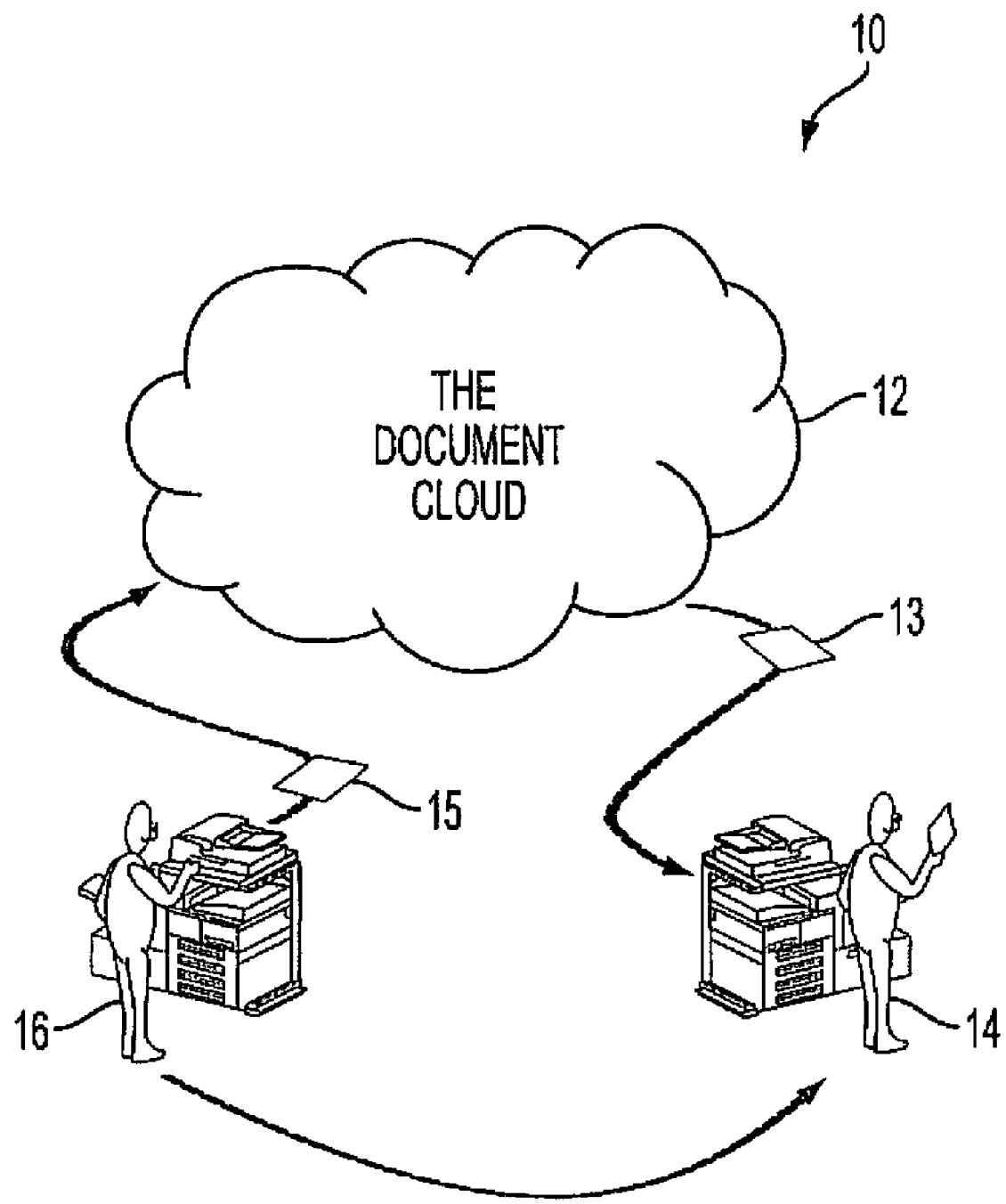
FIG. 1 is a schematic diagram of a "follow-me" document service including one or more multifunction devices (MFDs), in accordance with the present disclosure.

The present disclosure proposes eliminating the need for remote server storage by creating a document storage "cloud." In the present disclosure, the disk systems of multiple MFDs or personal computers (PCs) are organized as one large, distributed virtual disk that can be accessed from any device within the document storage cloud.

The present disclosure further proposes security and reuse mechanisms that enable the document originator to specify access rights (e.g., who may access a document and how many times it may be accessed before deletion). The present disclosure further seeks to (1) eliminate the need for centralized server storage, (2) to simplify multipoint access and to reuse scanned/printed tasks/jobs, and (3) increase document security.

The present disclosure proposes a "follow-me" document service integrated with MFDs so that a document can be reliably stored and retrieved from a multitude of geographically separated print devices. Furthermore, the "follow-me" document service supports printing at one MFD and retrieval at another MFD. Also, the effort level required from a user perspective is minimal and would be equivalent to that of printing or emailing. For instance, once documents are dispatched to one printer, they may be cached into a temporary storage station for a certain period of time or a certain number of permissible retrievals. The temporary storage station is implemented by utilizing a document cloud. The document cloud may be a collection of information/data on a multitude of heterogenous printing devices.

As a result, the present disclosure enables the following exemplary scenarios: (a) if a print operation failed, an individual can walk to the next nearest printer to retrieve the document and (b) if an individual prints a document in, say, Webster, N.Y. the document can be retrieved in, say, San Jose, Calif. on a different MFD for a limited time-period. Thus, the proposed present disclosure uses a replicated and distributed file system on MFDs.

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

Moreover, as users are moving around there is no flexibility to pull out a printing task, with or without conversion, at any desired geographical location. If the aforementioned capability (which is referred to herein as multi-point "follow-me" access enabled by the "follow-me" document service) is present, the users are not inconvenienced by failed printers or print tasks/jobs, owing to the fact that the dispatched document is available at the next nearest printer. The penalty associated with not having this service is that the user has to re-dispatch the tasks/jobs from his or her computer.

Furthermore, within corporate accounts for example, this service could help users to print out at extra copy of a document or perform other document operations on a previously printed document even when the user (e.g., who is not carrying the printout) is not near his primary or preferred printer. In essence, the document digitally moves along with the user without the user exuding any effort to store the document. In the interest of security, the document resides on the MFD(s) only for a small time-period set by the user and is transferred to other devices that hold security certificates through the secure-socket layer (SSL).

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "retrieval" can refer to any procedure for searching for and extracting database records or content.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "EIP application" refers to a Xerox® EIP, which is a software platform upon which developers can use standard web-based tools to create server-based applications that can be configured for the MFD's touch-screen user interface. Xerox® EIP is a software platform inside many Xerox MFD's that allows independent software vendors and developers to easily create personalized and customized document management solutions that one can access right from the MFD touch screen. These solutions can leverage one's existing infrastructure and databases. EIP is based on web standards such as HTML, CSS, XML and JavaScript. EIP also uses standard secure protocols, such as HTTPS and SSL. EIP stands for Extensible Interface Platform.

The term "document" may refer to a written or printed paper that bears the original, official, or legal form of something and can be used to furnish decisive evidence or information. The term "document" may also refer to a piece of paper that provides a record of something. The term "document" may also refer to any writing that provides information and/or anything serving as a representation of a person's thinking by means of symbolic marks and/or to any word-processing files, e-mail messages, spreadsheets, database tables, faxes, business forms, images, or any other collection of organized data.

The term "additional operations" may refer to printing, scanning, faxing, editing or any other type of document operations.

Embodiments will be described below while referencing the accompanying figures. The accompanying figures are merely examples and are not intended to limit the scope of the present disclosure.

With reference to FIG. 1, there is presented a schematic diagram of a "follow-me" document service including one or more multifunction devices (MFDs), in accordance with the present disclosure. The "follow-me" document service 10 includes a document cloud 12, a first multifunction device (MFD) 14, and a second MFD 16. The "follow-me" document service 10 further includes a first document 13 and a second document 15.

In FIG. 1, the first MFD 14 and the second MFD 16 are connected to the document cloud 12. A user of the first MFD 14 can scan or print a document via the first MFD 14. The user may then pick up the first document 13 at the second MFD 16. Additionally, one or more other users may pick up the first document 13 at the second MFD 16. Also, the first MFD 14 and the second MFD 16 may be located within the same room or the same building or the same facility in the same location. However, the first MFD 14 and the second MFD 16 may be located in separate geographical locations.

The "follow-me" document service can be architected using MFDs 14, 16, a document cloud 12 that resides atop the MFDs 14, 16 (and/or other devices), a portal service to bridge MFDs 14, 16 (and/or other devices), and a number of clients that can serve as "on ramps" and "off ramps" that carry documents into and out of the document portal(s).

The proposed "follow-me document" service uses a document cloud 12 which is basically distributed replicated storage for documents that are processed at MFDs 14, 16. With such a document cloud 12, users may store or retrieve documents 13, 15 from anywhere, using any available protocol. The physical location (or locations) at which the documents 13, 15 are stored is not relevant. However, what is relevant is that the documents 13, 15 or their replicated copies are accessible wherever the user is, as illustrated in FIG. 1.

Moreover, MFDs 14, 16 should have the capability to share resources with the document cloud 12 and have the "follow-me" service installed. The "follow-me" service can itself have a client that may find and join a network of other MFDs which can provide this service. Additionally, the types of nodes that join this network are customizable and could be heterogenous.

A distributed document portal service may be used on a subset of the available MFDs 14, 16 located in a network. The function of the portal service is to bridge together all the MFDs 14, 16 that are providing the service. Specifically the function of the portal is to provide the ability to store a document, and a set of properties describing the document (such as the document owner and the lifecycle of the document (e.g., the number of times that the document may be accessed before it is removed, how long the document should be available, etc.)), the ability to search for documents that match a set of properties (e.g., find documents by owner), the ability to retrieve a specific document given sufficient identifying criteria (at a minimum owner and document name), and the ability to delete a document from the system. The document portal ensures that the "follow-me" document service 10 operates in accordance with a users desired preferences.

Figure 2:
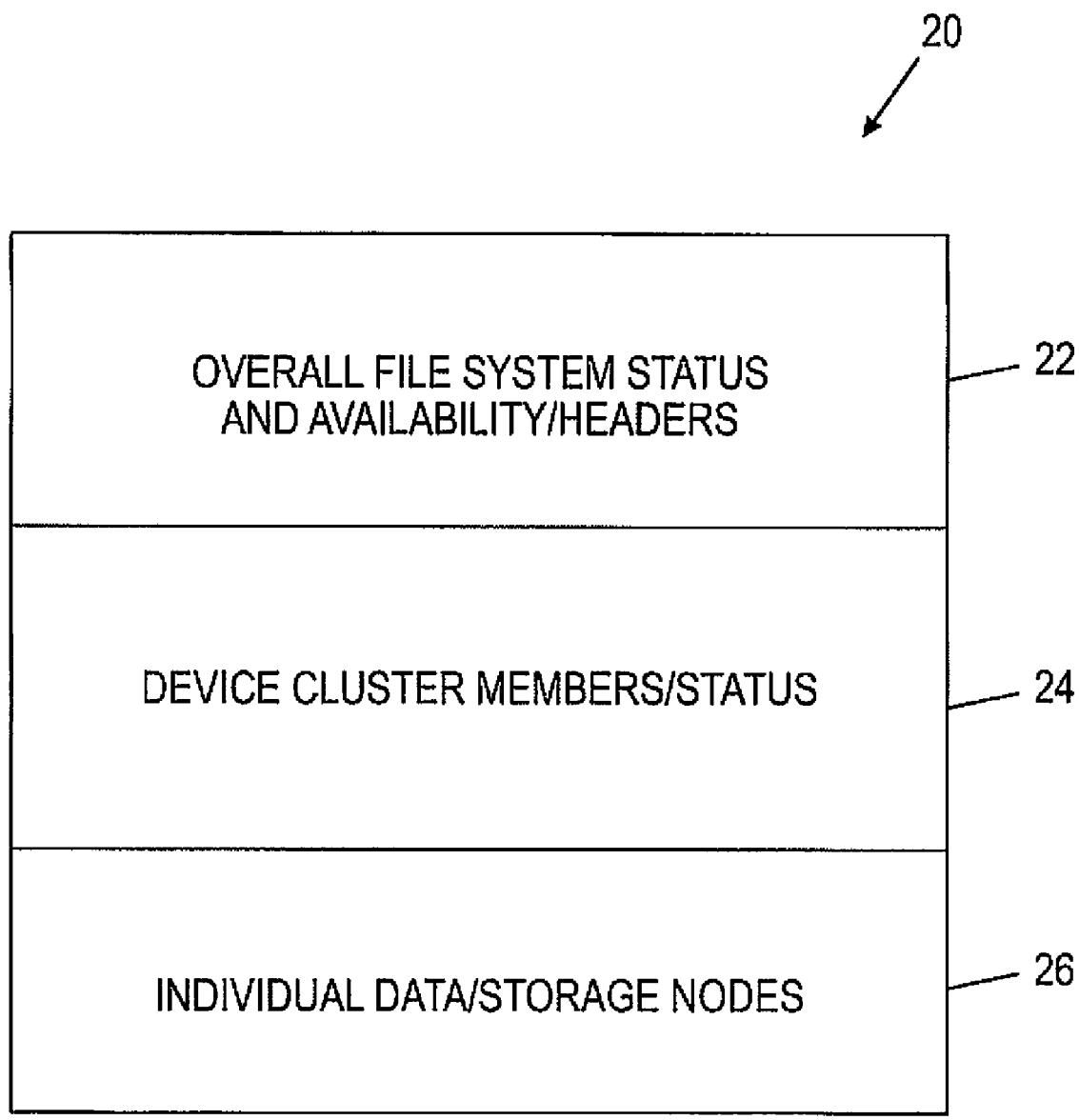
FIG. 2 is a display screen illustrating the availability of storage in a "follow-me" document service of FIG. 1, in accordance with the present disclosure.

With reference to FIG. 2, there is presented a display screen illustrating the availability of storage in a "follow-me" document service of FIG. 1, in accordance with the present disclosure. The display screen 20 includes a header portion 22 referred to in FIG. 2 as Overall File System Status and Availability/Headers, a cluster summary portion 24 referred to as Device Cluster Members/Status, and a node section 26 referred to as Individual Data/Storage Nodes.

FIG. 2 describes the actual availability of storage on a document cloud 12 of FIG. 1 where a collection of MFDs 14, 16 each shares some storage space (e.g., hard disk space). The header portion 22 includes, but is not limited to, preliminary information, such as a start date, a version number, date of last compile, and/or recent upgrades. The cluster summary portion 24 includes a summary of cluster information including, but not limited to, the capacity of hard drives, distributed file system (DFS) remaining, DFS used, the percentage of DFS used, live nodes, and dead nodes. The node section 26 includes, but is not limited to, a number of nodes, a last contact with the nodes, the state of the nodes, the size of the hard drive at each node, the percentage of space used, the remaining space available, and the number of blocks. It is envisioned that one skilled in the art may include a number of other parameters relevant to such storage service.

The document portal service, henceforth referred to as "Follow-Me Documents Service" (FMD) can be installed on at least one node. At least one MFD is configured with a file repository that transfers scanned images to a nearby node via hyper text transfer protocol (HTTP) or SSL. The MFD can also be configured with a scan template that uses the file repository to transfer scanned images to one or more nearby nodes as a single, multi-page tagged image file format (TIFF).

Additionally, an EIP application called "Follow-Me In" (described below with reference to FIG. 3) may have been previously registered on the MFD. This adds an icon that accesses the EIP application to a "Custom Services" tab in the MFD user interface (UI). The "Follow-Me In" application acts as a client to the FMD service for the purpose of storing scanned documents.

An EIP application called "Follow-Me Out" (described below with reference to FIG. 4) may have been previously registered on at least one MFD (not necessarily the same MFD). This adds an icon that accesses the EIP application to the "Customer Services" tab in the MFD UI. The "Follow-Me Out" application acts as a client to the FMD service for the purpose of retrieving documents that have been previously stored. As a result, FIG. 2 illustrates how and FMD interacts with one or more MFDs to control the hard drive space of each MFD.

The present disclosure is implemented as two interacting applications. The first is called "Follow-me In Service" which stores the document from an input client in the cloud through a portal (described in detail below with reference to FIG. 3). The second is called the "Follow-me Out Service" which retrieves the document from the document cloud through a portal from the document cloud (described in detail below with reference to FIG. 4). The actual copy of the document retrieved may be a replica or a transformed version as this choice is dictated by the user. In this implementation the input client may be a scanning process and the output client may be a printing process. However, the input client and the output client refer to any type of process. Additionally, both of these exemplary clients may be implemented by using an extensible interface platform (EIP) application.

Figure 3:
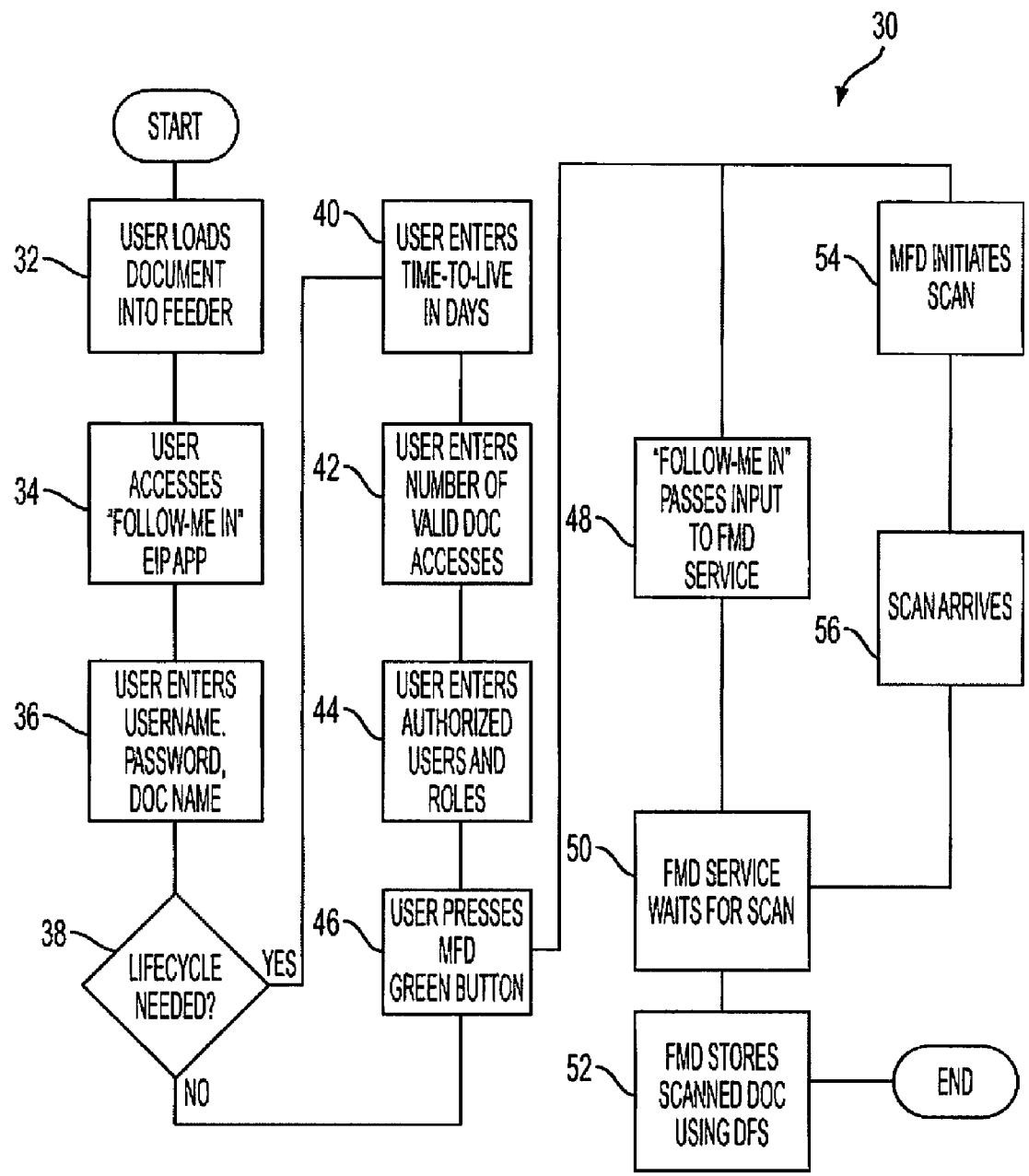
FIG. 3 is a flowchart of a "follow-me in" application of the "follow-me" document service of FIG. 1 illustrating input mechanisms, in accordance with the present disclosure.

With reference to FIG. 3, there is presented a flowchart diagram of a "follow-me in" application of the "follow-me" document service of FIG. 1 illustrating input mechanisms, in accordance with the present disclosure. The flowchart 30 includes the following steps. In step 32, the user loads a document into a feeder. In step 34, the user accesses a "follow-me in" EIP application. In step 36, the user enters a username, password, and document name. In step 38, the user is asked whether a lifecycle is required. If it is not required, the process jumps to step 46. If it is required, the process continues to step 40.

In step 40, the user enters a "time-to-live in days" parameter. In step 42, the user enters a number of valid document accesses parameter. In step 44, the user enters authorized users and roles parameter. In step 46, the user presses the MFD green button to signal the entry of all desirable parameters. In step 48, the "follow-me in" passes input to the "follow-me documents service" (FMD). In step 50, the FMD service waits for a scan to take place. In step 52, the FMD stores a scanned document by using a distributed file system (DFS). In step 54, the MFD initiates a scan. In step 56, the scan arrives. The process then ends.

The flowchart in FIG. 3 describes the path of the document into the cloud consisting of, for instance, 6 nodes including 3 MFDs.

Initially, the user approaches the MFD upon which the "Follow-Me In" application has been registered and performs the following steps.

In a first step, the user loads the hard copy document into the document feeder.

In a second step, the user accesses the "Follow-Me In" EIP application via the "Custom Services" tab in the MFD UI.

In a third step, using the soft keyboard in the MFD touch screen UI, the user enters a username, password, and a document name into the "Follow-Me In" UI when prompted.

In a fourth step, optionally, the user selects the "Document Lifecycle" tab in the "Follow-Me In" UI to specify properties of the document lifecycle. This may include the following parameters: (i) a time to live in days (how long the document is stored in the system before it is automatically deleted), (ii) the security level (whether or not the document may be stored outside the corporate firewall), (iii) the number of times that the document may be accessed before being removed from the system, (iv) the users or roles that may access the document (besides the document owner), and (v) once all of the required information has been entered, the user presses a "green button" on the MFD.

In a fifth step, the "Follow-Me In" EIP application collects the user input, and passes it to the FMD service, also specifying the hostname of the MFD upon which the "green button" was pressed.

In a sixth step, the MFD initiates the scan, and uses the scan template to transfer the scanned image as a single, multi-page TIFF to a nearby node.

In a seventh step, the FMD service waits for the scan to arrive from the specified host. Once the file arrives, the FMD service uses the DFS to store the document, preserving the owner identity, document name, and any lifecycle properties that were specified in the UI.

Concerning input clients, input clients are a collection of clients to the document user portal service, each of which supports one or more protocols for transporting documents into the document cloud. Such clients can take many forms, and may be installed in any number of ways. Some examples of input clients include:

1. A print driver that installs a printer that appears in the list of available printers on a client workstation. When choosing to print a document from an arbitrary application, the user is able to select "Follow-Me Documents" among the list of printers. The driver establishes a connection to the local network, locates a nearby document portal service, and uploads the document to the network through the portal. Existing print drivers could be enhanced to include a checkbox that allows the user to indicate that they would like a document to be stored in addition to printing it. Such a driver would perform all of the above tasks in parallel to its normal task of formatting the document and sending it to an MFD for printing, thus performing the storage in the cloud as a side-effect of the normal print process.

2. A simple "port 9100" driver that streams postscript data to a service on the network, such a service may convert the documents to a more suitable format (e.g. PDF—portable document format) and then store it in the document cloud.

3. An EIP application installed on an MFD. Such an application would allow a user to specify a valid username, password, and document name before using the "green button" to scan the document that is then stored in the document cloud.

4. A server that monitors a specific e-mail address on a corporate server. Each time an e-mail with an attached document is sent to that address from within the enterprise, the attachment is stored in the document cloud.

5. A website that accepts file uploads.

6. The normal print operation through a modified follow-me service enabled driver (with a checkbox for the follow-me operation) could also serve as an input to the "follow-me in" service.

Figure 4:
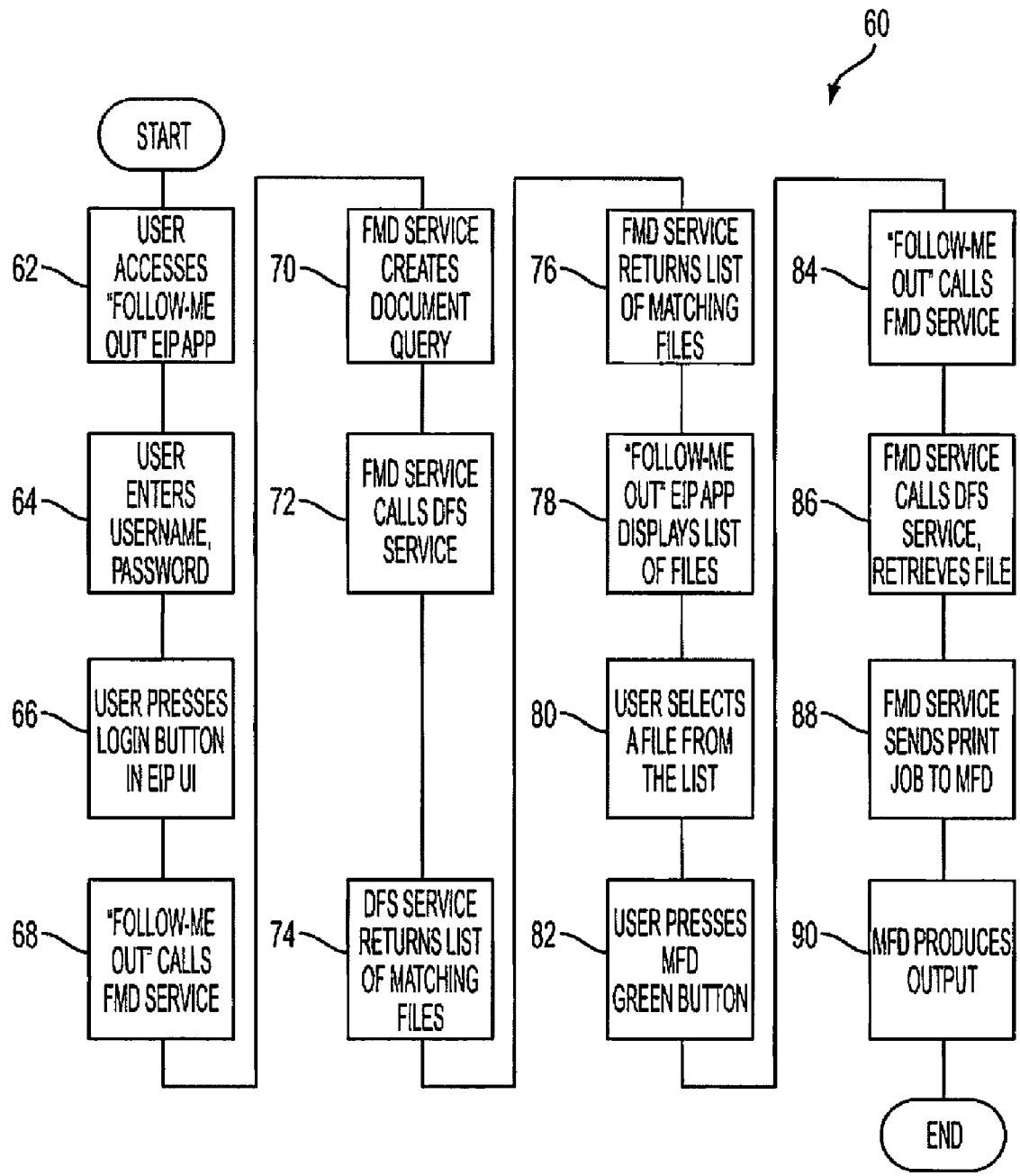
FIG. 4 is a flowchart of a "follow-me out" application of the "follow-me" document service of FIG. 1 illustrating output mechanisms, in accordance with the present disclosure.

With reference to FIG. 4, there is presented a flowchart diagram of a "follow-me out" application of the "follow-me" document service of FIG. 1 illustrating output mechanisms, in accordance with the present disclosure. The flowchart 60 includes the following steps. In step 62, the user accesses a "follow-me out" EIP application. In step 64, the user enters a username and password. In step 66, the user presses a login button in the EIP user interface (IU). In step 68, the "follow-me out" calls the FMD service. In step 70, the FMD service creates a document query. In step 72, the FMD service calls the DFS service. In step 74, the DFS service returns a list of matching files. In step 76, the FMD service returns a list of matching files. In step 78, the "follow-me" EIP application displays a list of files. In step 80, the user selects a file from the list of files. In step 82, the user presses the MFD green button. In step 84, the "follow-me out" calls the FMD service. In step 86, the FMD service calls the DFS service and retrieves the file. In step 88, the FMD service sends print jobs to the MFD. In step 90, the MFD produces an output. The process then ends.

The flowchart in FIG. 4 describes the path of the document out of the cloud in an implementation consisting of, for instance, 6 nodes including 3 MFDs. The flowchart may include the following steps:

1. Initially, the user approaches the MFD upon which the "Follow-Me Out" application has been registered. Note that this is not necessarily the same MFD from which the document was scanned in, as described in FIG. 3.

2. The user accesses the "Follow-Me Out" EIP application via the "Custom Services" tab in the MFD UI.

3. Using the soft keyboard in the MFD touch screen UI, the user enters a username and password before pressing the "login" button in the "Follow-Me Out" UI.

4. The "Follow-Me Out" application calls the FMD service to search for any documents belonging to the user.

5. In turn, the FMD service creates a query, which is passed to the DFS to search for files stored. Additionally, the FMD service may use the DFS to search for documents stored by other document owners, but to which the user has been given access by username or by role. The FMD service returns the list to the "Follow-Me Out" application.

6. The "Follow-Me Out" application displays the list in the MFD UI.

7. The user scrolls through the list and chooses the name for the document that he or she wishes to print locally.

8. Once the document is selected, the user presses the "green button" on the local MFD.

9. The "Follow-Me In" application transmits the MFD hostname, username, password, and name of the document selected by the user to the FMD service. The FMD service uses the DFS to retrieve the selected file, and then submits the file to the MFD as a print job.

10. The MFD prints the requested document.

11. The user retrieves the document and exits out of the "Follow-Me Out" application.

In addition to the information in the above flowchart, the "Follow-Me Out" interface can be used by the file owner to edit file properties such as changing file time, security level, and users/roles that can access the file, etc. Files in the system are updated with the changed metadata.

Concerning retrieving clients, retrieving clients are a collection of clients to the document portal service, each of which supports one or more protocols for retrieving documents from the cloud. Such clients can take many forms, and may be installed in any number of ways. Some examples of retrieving clients include:

1. An EIP application installed on an MFD. Such an application allows a user to specify a valid username and password to login. Once logged in, the application displays a list of documents belonging to (or otherwise available to) that user. The user selects a document, and presses the "green button" at which point the document is retrieved from the cloud printed at the MFD.

2. A "portal UI" that allows users to connect to the network and perform searches and queries of the documents that they have stored in the distributed system. From here users may view, download, delete, or modify the lifecycle settings of documents.

3. A cell phone user sends a text message to a special number set up by the company that includes a document name. A service maps the user's phone number to a database of user IDs, locates the correct document, and the document is sent back as an e-mail message attachment to the user's cell phone.

4. A web-based interface to the portal and/or MFD to accept file downloads.

Figure 5:
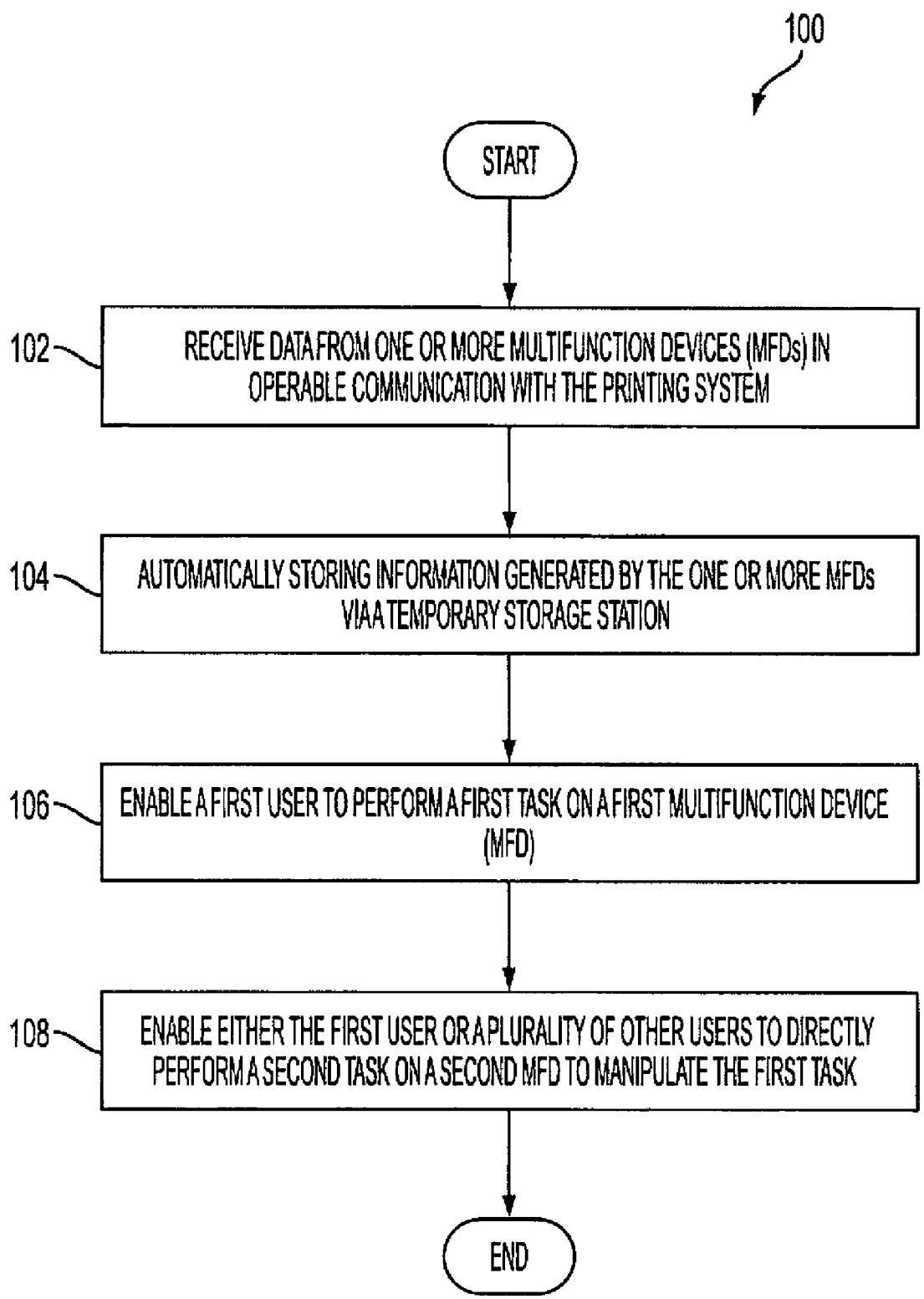
FIG. 5 is a flow chart illustrating a method for storing, accessing, and retrieving documents within a multi-point document printing system, in accordance with the present disclosure.

With reference to FIG. 5, there is presented a flow chart diagram illustrating a method for storing, accessing, and retrieving documents within a multi-point document printing system, in accordance with the present disclosure. The flowchart 100 includes the following steps. In step 102, data is received from the one or more MFDs in operable communication with the printing system. In step 104, information generated by the one or more MFDs is automatically stored in a temporary storage station. In step 106, a first user is enabled to perform a first task on a first MFD. In step 108, the first user or a plurality of other users are enabled to directly perform a second task on a second MFD to manipulate the first task. The process then ends.

Additionally, pieces of a large file may be split and stored on multiple MFDs. This may be done for storage related performance reasons (e.g. in transit time of files). The portal is responsible for finding and assembling the pieces of a file, if any.

The advantages of providing this service are as follows. The usability of the printers is enhanced. For example, busy and forgetful users are helped as they need not be burdened with carrying their document(s) with them. The users do not set up a server, much less think out a storage service that has to be bought and installed on the server. Device failures (soft or hard) are not relevant (e.g., in office environments with multiple printers and non-concurrent failures which is mostly the case) when the aforementioned service is present because in facilities where multiple printers are present, alternate printers would have the printed document even though the document was not primarily directed to them.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printing system for storing, accessing, and retrieving data, the printing system comprising:
    a distributed file system including a number of data storage nodes in operable communication with a network;
    a first multifunction devices (MFD) in operable communication with the network, the first MFD including:
    a user interface providing first icons for enabling a user to access a "follow-me in" application and for receiving a print request,
    wherein after the access of the "follow-me in" application, the MFD generates a "follow-me in" user interface for prompting the user to enter a username, password, and document name and for providing a "document lifecycle tab" for the user to specify properties of the document lifecycle including: a time to live in days, whether or not the document can be stored outside a corporate firewall, a number of times the document can be accessed before being removed, users or roles that may access the document,
    wherein after receiving input information including the user name, password, document name and the parameters, actuation of a button on the MFD signals an entry of the input information upon actuation of a button and transfers the input information along with hostname information of the first MFD to at least one data storage node included in the distributed file system,
    wherein the MFD further includes a means to receive a document, the MFD initiating a scan of the document after the collection of the input information and hostname information to the "follow-me documents service, and a processor configured to transfer the scanned document to the at least one data storage node after the predetermined time period;
    a "follow-me documents service" installed on at least one of a number of data storage nodes included in the distributed file system, wherein the at least one data storage node is configured to store the image of the transferred scanned document a second MFD in operable communication with the network and being configured to be positioned in a different geographical location from the first MFD, the second MFD including:
a user interface providing second icons for enabling an authorized user to access a "follow-me out" application and for enabling retrieval of the document,
a display for enabling display of a list of documents being stored in the at least one storage node in response to the second application being selected by the authorized user, and
a printer for providing the document as output in response to the document being selected from the list.

2. The system according to claim 1, wherein the transferring occurs after a predetermined period of time.

3. The system according to claim 1, wherein first application is configured to acquire security settings from the user for enabling the document to be retrieved by the authorized user from the second MFD for a limited number of times.

4. The system according to claim 1, wherein the system is configured to enable additional operations to be performed on the document at the second MFD that retrieves the document.

5. The system according to claim 1, wherein the user interface is configured to enable a user to specify access rights of the document at the first MFD.

6. The system according to claim 1, wherein the system enables a user to scan a document via a scan request from the first MFD and then retrieve the document at the second MFDs on the network without re-sending another scan request from the first MFD.

7. The system according to claim 1, wherein failure of the first MFD to execute the print request automatically enables the second MFD on the network to execute the print request.

8. A method for storing, accessing, and retrieving data, the method comprising the steps of:
providing a distributed file system including a number of data storage nodes in operable communication with a network;
providing a "follow-me documents service" installed on at least one of a number of data storage nodes included in the distributed file system,
enabling a first multifunction devices (MFD) in operable communication with the network, the enabling including:
providing icons on a user interface for accessing a "follow-me in" application and for receiving a print request,
wherein after the accessing of the "follow-me in" application, generating a "follow-me in" user interface for prompting the user to enter a username, password, and document name and for providing a "document lifecycle tab" for the user to specify properties of the document lifecycle including: a time to live in days, whether or not the document can be stored outside a corporate firewall, a number of times the document can be accessed before being removed, users or roles that may access the document,
wherein after receiving input information including the user name, password, document name and the parameters, signaling entry of the input information after actuation of a button,
transferring the input information along with hostname information of the first MFD to a data storage node,
initiating a scan of a document after the collection of the input information and hostname information to the "follow-me documents service, and
transferring the scanned document to the data storage node after the predetermined time period;
storing the image of the transferred scanned document at the data storage node; and,
enabling a second MFD in operable communication with the network and being positioned in a different geographical location from the first MFD, the enabling including:
providing second icons on a user interface for enabling an authorized user to access a "follow-me out" application and for enabling retrieval of the document,
displaying a list of documents being stored in the at least one storage node in response to the second application being selected by the authorized user, and
in response to the document being selected from the list, rendering the image at the second MFD.

9. The method according to claim 8, wherein the transferring occurs after a predetermined period of time.

10. The method according to claim 8, wherein the document is retrieved by the authorized user from other MFDs on the network for a limited number of times.

11. The method according to claim 8, further comprising performing operations on the document at the second MFD.

12. The method according to claim 8, further comprising receiving from the authorized user specified access rights of the document.

13. The method according to claim 8, wherein the system enables the user to scan the document via a scan request at the first MFD and then retrieve the document at any of the other MFDs on the network without re-sending another scan request from the first MFD.

14. The method according to claim 8, further comprising executing the print request at any of other MFDs on the network in response to failure of the first MFD to execute the print request.

15. A computer program product comprising tangible media which encodes instructions configured for being executed by at least one processor for performing the method comprising the steps of:
providing a "follow-me documents service" installed on at least one of a number of data storage nodes included in the distributed file system,
enabling a first multifunction devices (MFD) in operable communication with the network, the enabling including:
providing icons on a user interface for accessing a "follow-me in" application and for receiving a print request,
wherein after the accessing of the "follow-me in" application, generating a "follow-me in" user interface for prompting the user to enter a username, password, and document name and for providing a "document lifecycle tab" for the user to specify properties of the document lifecycle including: a time to live in days, whether or not the document can be stored outside a corporate firewall, a number of times the document can be accessed before being removed, users or roles that may access the document,
wherein after receiving input information including the user name, password, document name and the parameters, signaling entry of the input information after actuation of a button,
transferring the input information along with hostname information of the first MFD to a data storage node,
initiating a scan of a document after the collection of the input information and hostname information to the "follow-me documents service, and transferring the scanned document to the data storage node after the predetermined time period;

storing the image of the transferred scanned document at the data storage node; and, enabling a second MFD in operable communication with the network and being positioned in a different geographical location from the first MFD, the enabling including:

providing second icons on a user interface for enabling an authorized user to access a "follow-me out" application and for enabling retrieval of the document, displaying a list of documents being stored in the at least one storage node in response to the second application being selected by the authorized user, and in response to the document being selected from the list, printing the document at the second MFD without requiring the print request be re-dispatched.

16. The computer-readable medium according to claim 15, wherein the document is stored in the memory device for a predetermined period of time.

17. The computer-readable medium according to claim 15, wherein the first MFD is configured to receive security parameters for retrieval of the document from the second MFD for a limited number of times.

18. The computer-readable medium according to claim 15, wherein the system is configured to enable additional operations to be performed on the document at the second MFD that retrieves the document.

19. The computer-readable medium according to claim 15, wherein the first MFD is configured to receive user-specified access rights of the document at the user interface.

20. The computer-readable medium according to claim 15, wherein the computer program product enables the user to scan a document via a scan request at the first MFD of the plurality of MFDs and then retrieve the document at the other MFDs on the network without re-sending another scan request from the first MFD.

21. The computer-readable medium according to claim 15, wherein failure of the first MFD to execute the print request automatically enables any of the other MFDs on the network to execute the print request.

\* \* \* \* \*